United States Patent [19]

Paek

[11] Patent Number: 5,291,320

[45] Date of Patent: Mar. 1, 1994

[54] HIGHER ORDER DIFFRACTION IN HOLOGRAPHY

[75] Inventor: Eung-Gi Paek, Freehold, N.J.

[73] Assignee: Bell Communications Research, Inc., Livingston, N.J.

[21] Appl. No.: 847,596

[22] Filed: Mar. 5, 1992

[51] Int. Cl.$^5$ .................. G03H 1/02; G03H 1/00
[52] U.S. Cl. ........................... 359/28; 359/1
[58] Field of Search ................. 359/1, 28, 30

[56] References Cited

U.S. PATENT DOCUMENTS

| | | | |
|---|---|---|---|
| 3,642,374 | 2/1972 | Matsumoto et al. | 359/1 |
| 3,778,128 | 12/1973 | Hannan | 359/30 |
| 4,904,033 | 2/1990 | Ikeda et al. | 359/12 |
| 4,997,747 | 3/1991 | Yoshida et al. | 359/12 |

Primary Examiner—Bruce Y. Arnold
Assistant Examiner—Darryl Collins
Attorney, Agent, or Firm—Leonard Charles Suchyta; James W. Falk

[57] ABSTRACT

A method and apparatus for highly efficient use of higher-order diffraction beam in holography. The thermoplastic hologram (10) is recorded at a recording angle ($\theta_R$) between two coherent beams (12, 14) equal to a first-order diffraction angle ($\theta_1$) corresponding to the angle ($\theta_2$) of the desired higher-order beam (18) set to the angular peak (22) of diffraction efficiency (20) of the material of the hologram. On read-out, the desired higher-order beam is read. By use of the invention, the intensity of a higher-order beam can be tuned and made nearly equal to that of the first-order beam. Thereby, useful non-linear holographic systems, such as an associative memory (FIG. 4), can be practically implemented.

10 Claims, 2 Drawing Sheets

HIGHER ORDER DIFFRACTION IN HOLOGRAPHY

FIELD OF THE INVENTION

The invention relates generally to holography. In particular, the invention relates to an optical method of recording and reading the holographic recording medium that increases the sensitivity of the medium.

BACKGROUND ART

Holography offers much promise as a storage medium, especially for images, and as pattern recognizers. See, for example, U.S. Pat. No. 4,988,153 issued Jan. 29, 1991 and U.S. patent applications Ser. No. 07/588,710, filed Sep. 27, 1990, now U.S. Pat. No. 5,121,228, issued Jun. 9, 1992 and Ser. No. 07/713,421, filed Jun. 10, 1991 now U.S. Pat. No. 5,138,489, issued Aug. 11, 1992, all by Paek. These holographic devices share a common configuration, as illustrated schematically in FIG. 1, for the recording and readout of the hologram. During the recording phase, a holographic recording medium 10 is simultaneously irradiated by an image beam 12 and a reference beam 14 which are coherent with each other and are angularly separated by the angle $\theta_R$, with the image beam 12 being displaced from the surface normal by the angle $\phi$. The image beam 12 in some sense bears an image, but its exact nature depends on the nature of the device being implemented. The holographic recording medium 10 is photo-sensitive to the light of the two beams 12 and 14, and the interference between them causes a hologram to be recorded in the recording medium 10. The hologram may be considered as a series of diffraction gratings recorded in the medium 10 corresponding to the Fourier transforms of the image in the image beam 12. Multiple holographic images can be recorded in the recording medium 10 by moving the reference beam 14 to a slightly different angular position $\theta$ near $\theta_R$.

If the device is used as an image pattern recognizer, during the read-out, an unknown image (assumed at this point to exactly correspond to one of the recorded images) is impressed on the image beam 12 and irradiates the recorded medium 10. No reference beam is used. The unknown image interacts with all the recorded holograms and is diffracted into a single beam 16 at an angle $\theta_1$ with respect to the axis of the image beam 12; the angle $\theta_1$ is close to $\theta_R$. That is, the diffracted beam 16 is coelinear to the reference beam 14 used to record that corresponding image. Accordingly, by determining the angle $\theta_1$ of the diffracted beam 16, the image or pattern is recognized. Such a pattern recognizer becomes powerful when queried with images that closely but not exactly resemble one of the recorded images. In this case, the diffracted beam 16 at the one angle $\theta_1$ having the greatest intensity indicates the recorded image most closely resembling the unknown image.

Holographic devices are typically limited by the photosensitivity of the recording medium 10. An example of such recording media for planar holograms is a thermoplastic plate, which is a thin plastic plate abutted to a photoconductor and which deforms in accordance with variations in light exposure. Such thermoplastic plates are described by Collier et al. in the text *Optical Holography* (Academic Press, 1971), pp. 298–305 and in *Operator's Manual: HC-300 Holographic Recording Device* from the Newport Corporation. As is well known, the diffraction efficiency for thermoplastic plates varies with the recording angle $\theta_R$. The sensitivity of thermoplastics is limited to a fairly narrow bandwidth of spatial frequency centered at about 800 lines per millimeter although the value may vary between 600 and 1200 lines per millimeter for different thermoplastics. A typical response curve 20 as a function of angle recording angle $\theta_R$ for 514.5 nm light is illustrated in FIG. 2 and has a peak 22 with a relatively narrow bandwidth at about $\theta_P = 20°$. The peak efficiency is about 12% for thermoplastics. Once the peak recording angle $\theta_P$ has been determined, in conventional practice, that angle $\theta_P$ is used as the central recording angle $\theta_R$ and any of the recording angles $\theta$ must be close to the peak 22. That is, to maximize intensity, the recording geometry is usually chosen so that $\theta_R \approx \theta_P$.

The diffracted beam 16 in fact represents the first-order diffraction beam at the first-order diffraction angle $\theta_1 = \theta_R$. Additional, higher-order beams are diffracted, for example, a second-order diffraction beam 18 at the angle $\theta_2$ from the axis of the image beam 12. In general, the angle for an n-th order diffraction beam is given by $$\frac{n\lambda}{d} = \{\sin\phi + \sin(\theta_n - \phi)\}, \quad (1)$$

where $\lambda$ is the wavelength of light and d is the period of the diffraction grating recorded in the hologram. If the reference beam 14 is normal to the surface so that $\phi = 0$, the equation simplifies to $$\frac{n\lambda}{d} = \sin\theta_n. \quad (2)$$

If the angles $\theta_n$ of interest are small, then $$\theta_n = n\theta_1, \quad (3)$$

where $\theta_1$ is the position of the first-order diffraction beam.

There are many applications where the higher-order diffraction beam would be useful. However, as shown in FIG. 2, the diffraction efficiency would be substantially reduced for the higher-order beams, for example, to about 1% for thermoplastics.

SUMMARY OF THE INVENTION

The invention can be summarized as a method of recording and reading a hologram for a higher-order beam, particularly a planar hologram recorded in a thermoplastic plate. The optimal angle $\theta_P$, for recording the hologram is determined. This optimal angle is treated as the angle for the desired higher-order beam $\theta_2$. The hologram is instead recorded at the angle of the corresponding first-order beam. Then, the hologram is read using the higher-order beam, now falling at the maximum sensitivity of the recording material.

The invention allows the diffraction efficiency for a selected higher-order beam to nearly equal that for the conventional first-order beam. It also allows tuning the hologram output to a selected diffraction order or pair of diffraction orders. The higher efficiencies for higher-order diffraction beams allow the design of low-cost, compact, robust, and self-aligned holographic systems, for example, a one-pass associative memory.

DETAILED DESCRIPTION OF THE PREFERRED EMBODIMENTS

The efficiency of higher-order diffraction beams in holograms can be significantly increased if the angle $\theta_n$ of the higher-order beam is made to coincide with the angle $\theta_P$ of the maximum sensitivity of the recording material and if the hologram is recorded at the angle $\theta_1$ of the corresponding first-order beam. The relationship of the higher-order diffraction angle and the peak diffraction efficiency of the first-order diffraction can be expressed as $\theta = \theta_{P1}$ for $n > 1$, where the subscript P1 is the peak diffraction efficiency of the first order diffraction.

Figure 1:
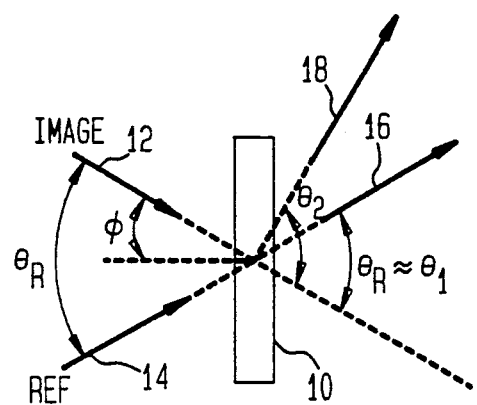
FIG. 1 is an illustration of the geometry of holographic recording and read-out.
Figure 2:
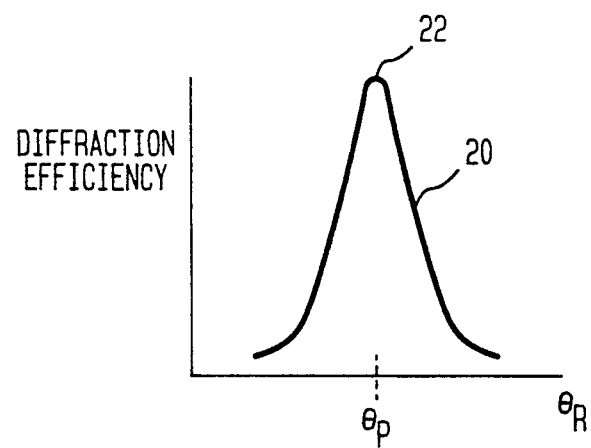
FIG. 2 is a graph of the sensitivity of a holographic recording medium to the angle of recording.
Figure 3:
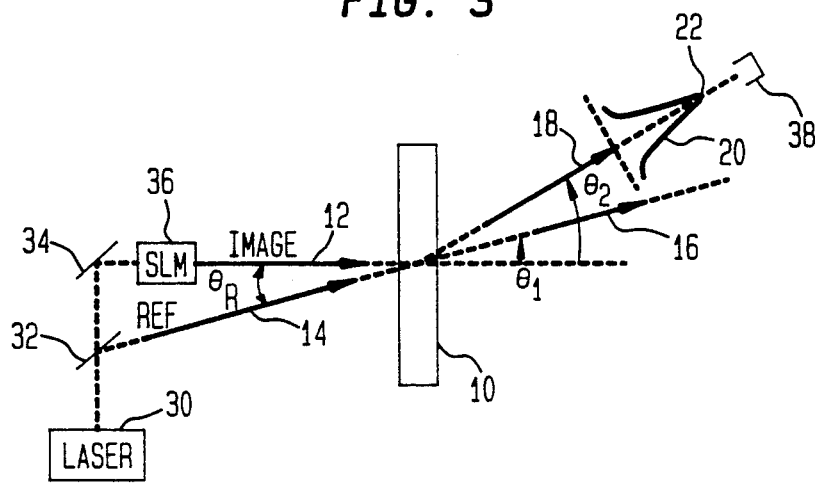
FIG. 3 is a an illustration of the geometry and apparatus for holographic recording and for the holographic read-out of higher-order beams.

A holographic configuration is illustrated in FIG. 3 which is intended to optimize sensitivity for the second-order diffraction beam 18 for the illustrated configuration, $\phi = 0$. The angular position $\theta_2$ of the desired higher-order beam 18 is set to $\theta_P$ so as to make it coincide with the peak 22 of the angular response curve 20 of the holographic recording medium 10. However, the hologram is recorded with the same configuration so that the recording angle $\theta_R$ between the image and reference beams 12 and 14 causes the first-order diffraction beam 16 to fall far off the peak 22 of the response curve 20. The recording angle $\theta_R$ is equal to the first-order diffraction angle $\theta_1$ corresponding to the second-order diffraction angle $\theta_2$ equaling the peak recording angle $\theta_P$. Equation (1), (2), or (3) may be used to relate the desired higher-order diffraction angle $\theta_n$ to the recording angle $\theta_1 = \theta_R \approx \theta_P$. Furthermore, the exposure is somewhat increased.

The equipment used to record the hologram can include a laser 30, a beam splitter 32, a mirror 34, and a spatial light modulator 36, which produce coherent image and reference beams 12 and 14. The spatial light modulator 36 impresses different known images on the image beam 12. The different images are recorded with small variations in the recording angle $\theta_R$. In the read-out process, the reference beam 14 is not used, and the spatial light modulator 36 impresses an unknown image on the image beam 12. A photo-detector 38 is placed in line with the higher-order diffraction beam 18.

I have performed some experiments to demonstrate the effectiveness of the invention. Thermoplastic plates, Model HC-301, available from the Newport Corporation, were recorded under a variety of conditions, and their resulting diffraction efficiencies were measured. The light was obtained from an argon laser having a wavelength of 514.5 nm. The efficiencies for all cases were dependent on the intensity of recorded light, and the efficiencies peaked around a few tenths of a second of irradiation. Under conventional, first-order recording, the peak was around 20° and the peak first-order efficiency for optimal recording intensity was about 11% while the peak second-order efficiency was about 2½%. On the other hand, under the inventive, second-order recording, the peak second-order efficiency was about 10% while the first-order and third-order efficiencies were less than 6% of the second-order efficiency. The optimal recording intensity for the second-order peak was increased by about a factor of two over that for the first-order peak. Even when the thermoplastic plate was tuned to fifth-order and recorded with a yet larger exposure, the fifth-order diffraction efficiency approached 10% while in the prior art an efficiency of much less than 0.001% has been expected. Paek et al. have described the invention and these results in "Enhanced nonlinear recording using a thermoplastic plate," *Applied Physics Letters*, volume 59, Aug. 26, 1991, pp. 1019-1021.

By means of the invention, a hologram can be tuned to a nearly arbitrary higher-order peak by adjusting the recording angle and increasing the recording exposure. If desired, two adjacent-order peaks may be tuned to nearly the same efficiencies if they are placed on opposite sides of the recording peak $\theta_P$.

The mechanism for the dramatic increase in diffraction efficiency is not completely understood. It has been observed in many types of thermoplastic plates used for planar holograms but not in other materials. However, thermoplastic plates offer many advantages in holography, such as the higher efficiency of a phase grating, room-temperature stability, and no chemical processing. Micrographic examinations of the holograms indicate that the higher recording intensities used for the higher-order peaks causes taller portions in the thermoplastic gratings to collapse and produce a higher-order grating. But the range of required exposure is relatively broad, and the effect is reproducible with not critical factors.

The discussion above assumed that the wavelength used to record the hologram equaled that used to diffract the recorded hologram. However, as I pointed out in my first cited patent, different wavelengths may be used in the two phases. The difference in wavelength affects the invention only in regards to the angular position $\theta_n$ of the detector 38 in the reader.

Figure 4:
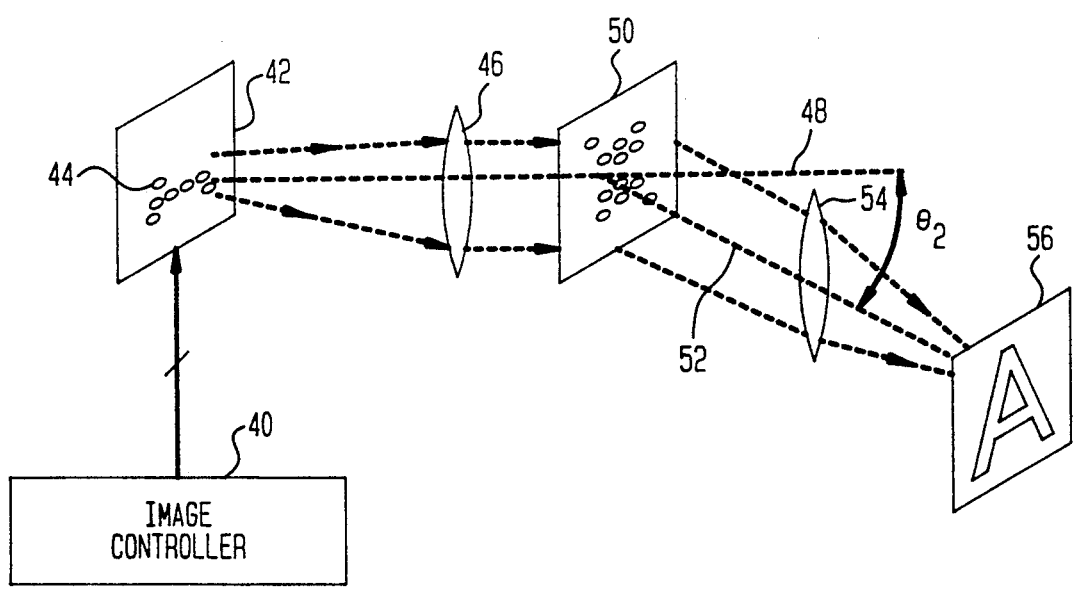
FIG. 4 is a perspective illustration of a second-order holographic associative memory incorporating the invention.

The invention can be advantageously applied to a second-order holographic associative memory. I have disclosed a first-order holographic associative memory in my third cited patent that requires light to twice traverse the hologram, once in each direction, in order to obtain a second-order correlation. However, because the efficiency of a Fourier hologram is typically much less than 10% even when optimized for the first-order peak, the round trip reduces the efficiency to less than 1%. In contrast, the second-order holographic associative memory of the invention, illustrated in perspective in FIG. 4, performs much the same correlation with a single pass through the hologram. An electronic image controller 40 impresses an image upon an array 42 of surface-emitting laser diodes 44 such that the pattern of the emitting diodes 44 corresponds to the image. The laser diodes 44 emit self-coherent beams, but the beams are not coherent among themselves. The beams are collimated by a lens 46 to be nearly parallel to an incident axis 48, along which they strike a hologram 50 of a thermoplastic plate that is Fourier prerecorded with multiple images corresponding to those impressed upon the laser array 42. The diffraction gratings in the hologram 50 cause second-order beams to be diffracted approximately parallel to a second-order axis 52 angularly separated from the incident axis 48 by $\theta_2$. Another lens 54 focuses the second-order beams onto a focal plane 56, for instance, a CCD imaging array, on which is displayed a reconstructed image. Many details of the apparatus may be found in the third Paek patent.

According to the invention, the hologram 50 is recorded with an imaging beam from the laser array 42 containing completely accurate images and an unillustrated reference beam angularly displaced from the imaging beam by an angle $\theta_1$ equal to the first-order diffraction angle corresponding to the second-order diffraction angle $\theta_2$. Also, the angular peak $\theta_P$ of the recording sensitivity of the hologram 50 is approximately $\theta_2$.

Multiple images are recorded in the hologram 50. During read-out only the image corresponding to the image impressed on the laser array 42 is displayed on the focal plane 56. However, the apparatus works not only as an image recognizer but also as an associative memory capable of recognizing only partial patterns or distorted patterns. If the pattern impressed on the laser array 42 is incomplete or distorted, the recorded pattern most closely resembling it will be most strongly displayed on the focal plane 56. Because the second-order or higher diffraction beam is being used, the less closely resembling patterns will be suppressed by the square of the recorded intensity. Thereby, the thresholding required in the first-order associative memory becomes unnecessary. However, the second-order memory reconstructs images so much clearer than does a first-order memory that its superior performance is not yet clearly understood.

Paek et al. have described the second-order associative memory of this invention in "Simplified holographic associative memory using enhanced nonlinear processing with a thermoplastic plate," *Optics Letters*, volume 16, Jul. 1, 1991, pp. 1034–1036. They experimentally demonstrated the effectiveness of the second-order memory and its superiority over the first-order memory. Furthermore, the one-stage, second-order memory requires fewer components and has no critical alignments because it is self-aligned. It is smaller and robust and thus reliable. The second-order diffraction substantially reduces cross-talk between recorded images over the first-order memory. Because of the higher efficiencies, relatively inexpensive laser diodes can be used instead of expensive argon lasers.

The invention thus allows the efficient use of higher-order diffraction beams in holographic apparatus. The higher-order beams provide non-linear optical processing of images and signals, which in the past have required high-intensity lasers. Thus, many useful holographic applications, which were however impractical with the lower diffraction efficiencies of the prior art, become commercially practical with the use of the invention.

What is claimed is:

1. A holographic method comprising irradiating a recording medium with a first optical beam and a second optical beam optically coherent with each other to thereby record a hologram in said recording medium, said recording medium comprising a thermoplastic plate and said hologram causing a third optical beam coincident with said first optical beam to be diffracted into at least one higher-order diffraction beam, said first and second beams having an angular separation between them such that the angle between said first optical beam and said higher-order diffraction beam substantially coincides with a peak optimum angle for the first order diffraction of said recording medium, said irradiating causing exposure for said higher order diffraction beam to be increased over what is necessary for said first order optical beam.

2. A holographic method as recited in claim 1, wherein said desired higher-order beam is a second-order beam.

3. A holographic method, comprising the steps of:
    recording in a thermoplastic plate a hologram with a first optical beam and a second optical beam coherent with each other and aligned with a recording angle between them:
    irradiating said recorded hologram with a third beam; and
    detecting a fourth beam diffracted from said recorded hologram, said third and fourth beams being disposed with a diffraction angle between them;
    wherein said diffraction angle is related to said recording angle as a higher-order diffraction angle is related to a first-order diffraction angle.

4. A holographic method as recited in claim 3, wherein said first, second, and third beams convey light of a substantially equal wavelength and said first-order and higher-order diffraction angles are related through said equal wavelength.

5. A holographic method as recited in claim 3, wherein said first and second beams convey light of a first wavelength and said third beam conveys light of a second wavelength and said first-order and higher-order diffraction angles are related through a comparison of said first and second wavelengths.

6. A holographic method as recited in claim 3, wherein said higher-order diffraction angle substantially equals the optimum angle which gives maximum first order diffraction efficiency of said hologram.

7. A holographic reading system, comprising
    a source of a beam of coherent light;
    a thermoplastic plate on which a hologram is recorded at a recording angle such that a higher-order diffraction angle $\theta_n$ approximately equals an angle $\theta_{P1}$ of peak diffraction efficiency of the first order diffraction of the hologram, so that $\theta_n \approx \theta_{P1}$ for $n > 1$ where the subscript P1 is the peak diffraction efficiency of the first order diffraction; and
    a light detector positioned at said higher-order diffraction angle relative to said beam of coherent light.

8. A holographic reading system as recited in claim 7, wherein said hologram is recorded with multiple images and said beam conveys a planar image, thereby providing an associative memory.

9. A holographic writing system, comprising:
    two beams of mutually coherent light propagating along axes angular disposed at a first angle; and
    a holographic recording medium comprising a thermoplastic plate and having a second angle of peak first-order diffraction efficiency for said light; and
    wherein said first angle has a value related to that of said second angle as a first-order diffraction angle for said light has a value related to a higher-order diffraction angle for said light.

10. A holographic method comprising the steps of recording in a thermoplastic plate with two recording beams at an angle determined for a higher-order beam, said recording including an exposure greater than required for conventional recording with a recording beam, and reading said hologram with said higher-order beam.

* * * * *